J. R. McWANE.
PIPE JOINT AND FILLER THEREFOR.
APPLICATION FILED APR. 12, 1917.

1,258,798. Patented Mar. 12, 1918.

WITNESSES
Howard D. Orr.
H. T. Chapman

INVENTOR,
James R. McWane,
BY E. G. Siggers.
ATTORNEY

UNITED STATES PATENT OFFICE.

JAMES R. McWANE, OF BIRMINGHAM, ALABAMA.

PIPE-JOINT AND FILLER THEREFOR.

1,258,798.  Specification of Letters Patent.  Patented Mar. 12, 1918.

Application filed April 12, 1917. Serial No. 161,546.

*To all whom it may concern:*

Be it known that I, JAMES R. McWANE, a citizen of the United States, residing at Birmingham, in the county of Jefferson and State of Alabama, have invented a new and useful Pipe-Joint and Filler Therefor, of which the following is a specification.

This invention has reference to pipe joints and fillers therefor, and its object is to provide a pipe joint structure for bell and spigot pipes, especially cast iron pipes, possessing a desirable degree of flexibility and permitting the production of a tight joint with a minimum amount of lead and labor, and without wastage.

The pipe joint is of the same general character as that shown and described in my application No. 144,768, for pipe joint and filler therefor, filed January 26, 1917, but differs therefrom in some respects.

The invention comprises a joint for bell and spigot cast iron pipe in which jute or other similar packing material is replaced by wood in the form of wooden hoops, and there is also provided a preformed filler of metal, such as iron, or of wood, with preformed lead strips, all of which are introduced into the bell of the pipe after the spigot end of the next pipe in order is located therein. The wooden strips substituted for jute provide a cheap and solid backing anvil against which the lead strips may be readily calked to produce a fluid tight joint, which, however, has a degree of flexibility found to be necessary for the successful use of cast iron pipe, and particularly present in bell and spigot pipe joints.

The ordinary bell and spigot joints are made with a preliminary packing of jute and the bell about the introduced spigot is filled with lead poured thereinto in a molten state, and which may be afterward calked up tight. Such pipe joints are wasteful of lead and unnecessarily time consuming in their preparation, since the lead must be melted at the trench and poured into the joint, the melted lead frequently spilling, while there are oxidization and other losses. Furthermore, the perfection of the joint is by no means certain.

The joint described in the aforesaid application overcomes the objections found in the ordinary bell and spigot joint, but is susceptible of improvement both in labor in the formation of the joint and in the preliminary cost of material.

It has been found that the jute previously used may be advantageously replaced by wooden hoops similar to barrel hoops, and made of proper size, such hoops providing a solid backing against which the final lead filling rings may be calked to better advantage than against jute, since the latter has a more or less cushioning effect interfering with the rapidity of calking.

With such wooden rings there is provided a lead-carrying series of wedge blocks usually of iron, but which may be of wood, so that the lead when finally calked into place is forced into intimate contact with the metal surfaces of both the bell and spigot parts of the pipe, and a fluid tight joint is thereby produced. Still there exists a degree of general flexibility in the joint which provides for slight bendings of the line of pipe at the joints without establishing such strains as would tend to fracture the more or less brittle cast iron pipe.

The invention will be best understood from a consideration of the following detailed description, taken in connection with the accompanying drawings, forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1:
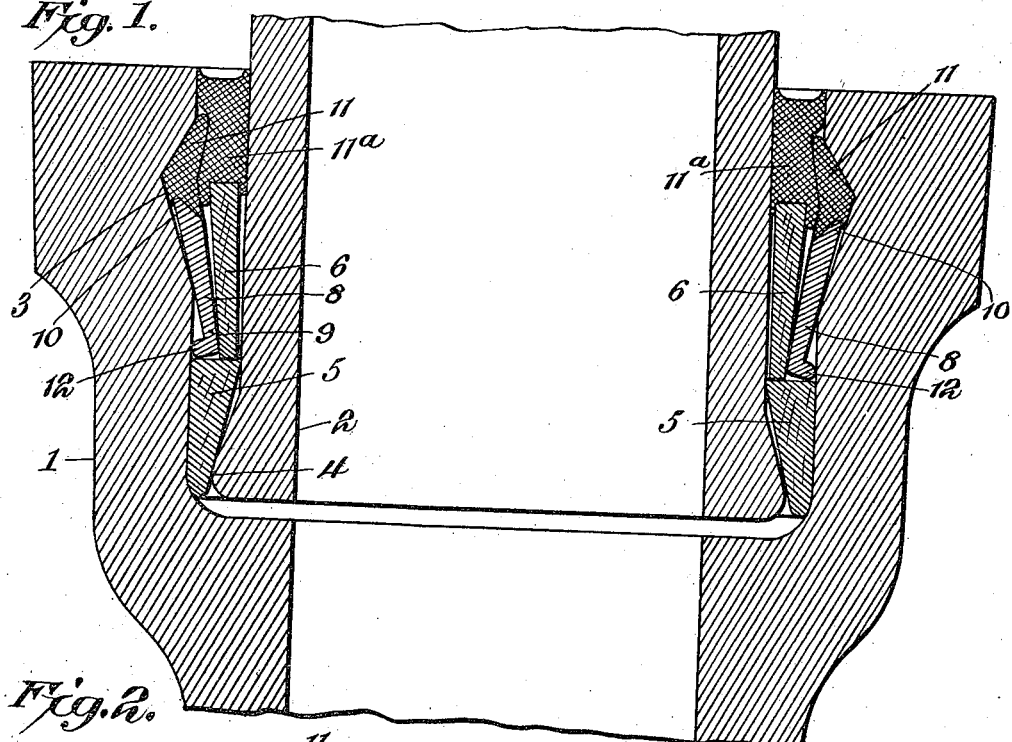
Figure 1 is a substantially diametric section of a bell and spigot pipe joint embodying the invention.
Figure 2:
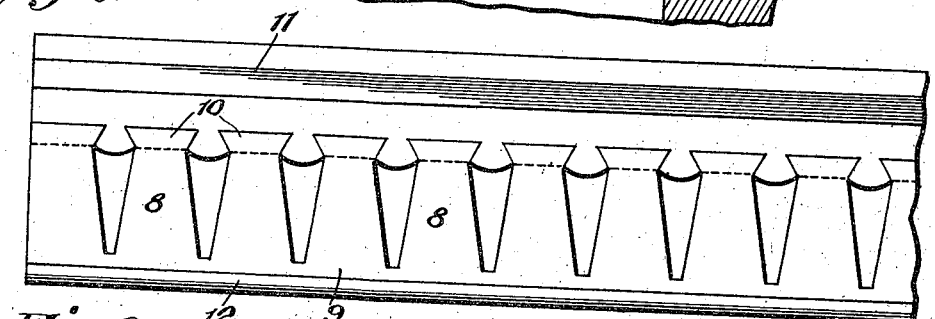
Fig. 2 is a plan view of a combined wedge block structure and lead ring anchored therein.

Referring to the drawings there is shown a bell end 1 and a spigot end 2 of the matching ends of two sections of bell and spigot cast iron pipe of standard construction. The inner wall of the spigot end 1 is provided with the usual lead-receiving groove 3, and the spigot end terminates in an outstanding annular flange 4 of ordinary construction.

Figure 3:
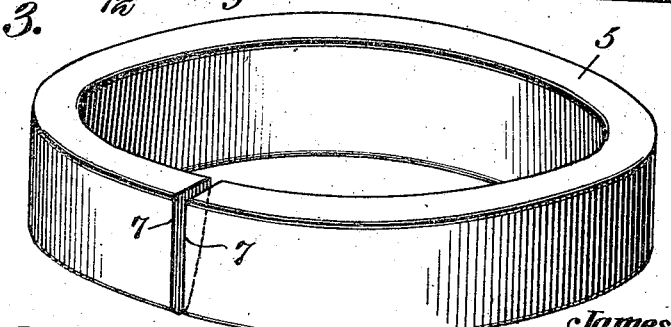
Fig. 3 is a perspective view of one of the wooden filler rings.

There are provided wooden hoops 5 and 6 of which the hoop 5 is shown separately in Fig. 3. These hoops may be made of the same material as wooden barrel hoops, and are discontinuous circumferentially, so that they may be opened and applied about the spigot end 2 of the corresponding pipe, the elasticity of the wood permitting such spreading open of the hoop. This produces adjacent ends 7 where the hoop is discontinuous circumferentially, and the hoop may be of such length that the ends 7 are nearly or quite in abutment when the hoop is in place in the bell end 1 about the spigot end 2.

The hoop 5 may be of such thickness as to about fill the space between the inner wall of the bell 1 and the outer wall of the spigot 2, and tapers so as to provide for the flange 4.

There is also provided a series of wedge blocks 8 joined together at their thin ends by a longitudinal web 9 and having their thick ends of dove-tail form, as shown at 1_, at which part of the series there is anchored a lead strip 11, all as disclosed in the aforesaid application. The series of wedge blocks, however, differs from the aforesaid application in that the web 9 is provided with a longitudinal bead 12 at the edge remote from the lead strip 11. This bead 12 causes the wedge blocks to assume a conical position with the base of the cone toward the mouth of the bell 1 when the parts are forced into place thus causing the lead strip 11 to seat in the groove 3.

When the joint is assembled and after the spigot 2 has been introduced into the bell 1 the wooden hoop or ring 5 is forced tightly into the basic end of the bell 1 and against the spigot 2 with its flange 4. Then the series of wedge blocks 8 is introduced into the bell 1 and spread into contact with the inner wall thereof, so that the lead strip 11 seats in the groove 3. This may be done by means of a suitable tool. Then the wooden ring or hoop 6, which may be quite similar to the ring or hoop 5, is introduced into the bell between the wedge blocks 8 and the outer wall of the spigot 2. By making the parts of proper size the ring 6 may be caused to wedge tightly into place, forcing the wedge blocks firmly into engagement with the inner wall of the bell 1. Now, lead, represented at 11$^a$, is forced into the mouth of the bell so as to engage the outer edge of the ring or hoop 6, and is tightly calked into the bell forcing the wooden rings and wedge blocks firmly into position and sealing the mouth of the bell.

In accordance with the procedure defined in the aforesaid application a number of lead rings may be introduced into the bell and compacted by calking tools to form the mass 11$^a$, and the calking may be sufficient to produce a substantial union between the mass 11$^a$ of lead and the strip 11, since lead is sufficiently ductile to admit of cohesion between contacting surfaces. Such calking is found to be efficient in the production of a liquid tight joint resistant to the passage of liquids from the interior to the exterior of the pipe. Such joints may even be made air or gas tight.

The advantage of the wooden rings beside their capability of acting as fillers, and thus saving lead, is that they form practically inelastic backing or anvil devices against which the lead may be quickly and firmly calked. In this respect the wooden rings are superior to jute, which has heretofore been almost universally employed in bell and spigot cast iron pipe joints. The jute as used in the joint described in the aforesaid application is more or less yielding or of a cushion nature, and hence interferes to some degree with the calking of the lead, making it correspondingly difficult to produce a thoroughly tight joint. The wooden rings overcome this difficulty, although, of course, they may not lessen the amount of lead employed over the joint of the aforesaid application.

While it is advantageous for some purposes to use metal wedge blocks 8, it is quite possible to replace these wedge blocks with a similar structure made of wood, so that the wedge structure may be either of metal, such as iron or steel, or of wood. When made of wood the bead or rib 12 may be retained so that the wedges will conform to the groove 3 as before. The lead strip 12 may be made fast to the wedge blocks when they are of wood, as well as when they are of metal. In either event the calking of the lead is accomplished in the same manner.

The joint described in providing a plurality of more or less elastic structures, such as the wooden hoops, not only provides a very cheap filling to replace a large proportion of lead as ordinarily used, but permits the requisite flexibility of the joint as a whole.

The wooden rings have another material advantage over jute in that they are more easily and quickly applied, for the driving of jute as a backing against which the lead is to be calked is a comparatively slow and tedious procedure.

Instead of either metal or wooden wedge blocks it is possible to employ a wooden hoop, but there are some advantages present in the wedge blocks on account of their capability of conforming readily to the somewhat conical shape of the groove 3.

What is claimed is:—

1. A bell and spigot pipe joint provided with wooden filling means seated in the bell member of the joint, and a lead sealing between the wooden means and the mouth of the bell, said wooden means constituting an effectively solid anvil against which the lead may be calked.

2. A bell and spigot pipe joint provided with a plurality of wooden rings or hoops therein abutting lengthwise of the joint, and lead sealing means between the rings and the mouth of the bell, the rings or hoops constituting an effectively solid anvil means against which the lead may be calked.

3. A bell and spigot pipe joint having wooden filling means within the bell extending from the basic end thereof toward the mouth of the bell, and lead sealing means between the wooden filling means and the mouth of the bell and in intimate contact with the inner wall of the bell and the outer wall of the spigot member of the joint, the wooden filling means constituting an effectively solid anvil against which the lead may be calked.

4. A bell and spigot pipe joint having a wooden ring within the bell at the basic end thereof, another wooden ring and wedge blocks engaging the first-named ring, and lead sealing means between the second wooden ring and wedge blocks and the mouth of the bell.

5. A bell and spigot pipe joint having a wooden hoop or ring seated in the basic end of the bell between the latter and the spigot member of the joint, a series of wedge blocks seated on the wooden ring or hoop and having an outstanding bead at the seated end, another wooden ring interposed between the wedge blocks and the spigot member of the pipe joint, and lead sealing means at the mouth end of the bell compacted against the wedge blocks and the second-named wooden ring or hoop.

In testimony that I claim the foregoing as my own, I have hereto affixed my signature in the presence of two witnesses.

JAMES R. McWANE.

Witnesses:
E. W. HERRMANN,
C. W. HENRY.

Copies of this patent may be obtained for five cents each, by addressing the "Commissioner of Patents, Washington, D. C."